Patented Oct. 16, 1923.

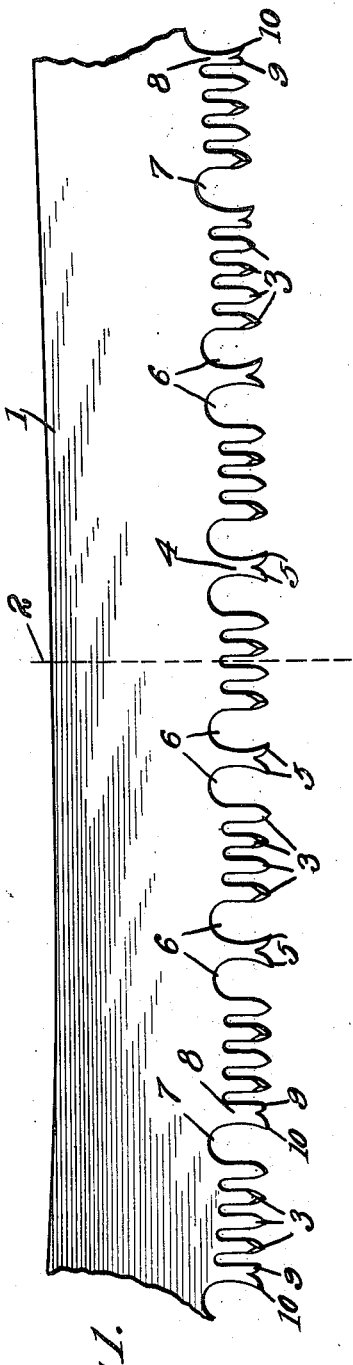
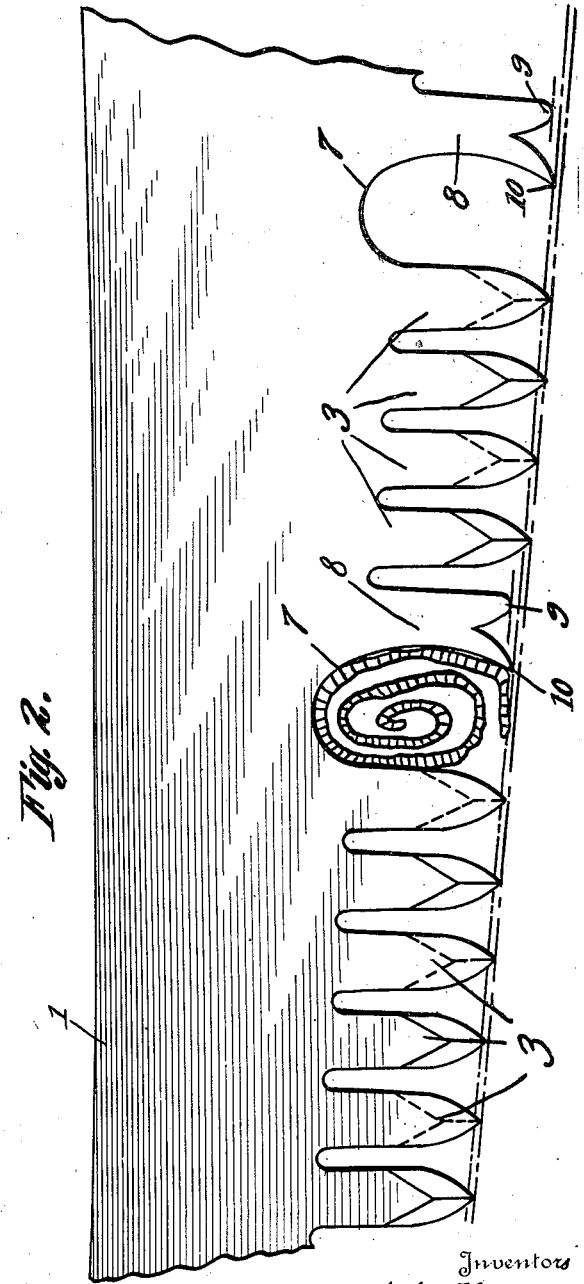

1,470,871

UNITED STATES PATENT OFFICE.

LENNART OSTERDAHL AND HARRY GLENMORE COWLING, OF FAIRFAX, WASHINGTON.

CROSSCUT SAW.

Application filed December 1, 1921. Serial No. 519,236.

*To all whom it may concern:*

Be it known that we, LENNART OSTERDAHL and HARRY GLENMORE COWLING, citizens of the United States, residing at Fairfax, in the county of Pierce, State of Washington, have invented a new and useful Crosscut Saw, of which the following is a specification.

This invention relates to cross-cut saws, one of its objects being to rearrange and to change the shape of the raker tooth on a cross-cut saw whereby each raker and its lead portion are combined in one tooth and are so positioned as to eliminate dead sawdust spaces such as are provided in saws where the rakers are located between two spaces only one of which becomes active during each cutting operation.

A further object is to increase the efficiency of the saw by providing only one sawdust space adjacent each raker tooth, A still further object is to provide those points of the rakers nearest the center of the saw with rounded extremities located inwardly or upwardly from the path of movement for the other points of the rakers so as to form lead portions whereby a felling saw can be more readily pulled and will cut faster than where the raker is provided with two diverging cutting points as heretofore.
A still further object is to provide more teeth in a saw of given length than is possible where each raker is extended between two sawdust spaces, thus correspondingly increasing the efficiency of the saw.

Another object is to provide an improved construction and arrangement of rakers which can be used in connection with felling saws of different types.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a side elevation of the middle portion of a felling saw having the present improvements combined therewith.

Figure 2 is an enlarged side elevation of a portion of a felling saw and showing the action of one of the lead points of a raker gathering a ribbon of wood into the sawdust space in advance thereof.

Referring to the figures by characters of reference 1 designates a portion of a saw blade the center of which is designated by a broken line shown at 2 in Figure 1. This line bisects the central group of cutter teeth 3 which, in the present instance, consist of four teeth filed on opposite sides alternately. Similar groups of cutter teeth are located along the edge of the saw and those groups nearest the center of the saw are separated by rakers 4 of the usual construction each of which has oppositely curved raker points 5, each of said rakers being spaced from the group 3 adjacent thereto by sawdust spaces 6. This old arrangement is only provided adjacent the center of the saw blade. At other points the groups of cutter teeth 3 are separated by a single sawdust space 7 and one of the end teeth of each group constitutes a raker as shown at 8. The rakers 8 are similar to the rakers 4 with the exception that those points thereof nearest the center of the saw are hammered down or swaged to provide rounded terminals 9 constituting lead teeth while the other points of the rakers which are farthest removed from the center of the saw remain as heretofore and form raker teeth as shown at 10.

With this arrangement it will be noted that for the greater portion of the length of the saw there is only one sawdust space adjacent each raker, this space being in advance of the tooth 10. Thus during the movement of the saw in one direction the teeth 10 on one-half of the saw will collect the sawdust and ribbon produced by the cutter teeth 3 and gather them into the spaces 7, while during the movement of the saw in the opposite direction the raker teeth 10 on the other half of the saw will gather the sawdust and wood ribbon into the spaces 7 adjacent thereto and the first mentioned raker teeth 10 remain inactive, the lead teeth 9 thereof riding freely through the cut and materially reducing the pull necessary to operate the saw. Instead of providing a pair of sawdust receiving spaces adjacent each raker, as heretofore, one of which spaces becomes dead during each cutting operation, one of said spaces adjacent each raker is utilized in the present instance for holding an additional cutter tooth so that the efficiency of the saw is greatly increased.

Although the improvement has been shown and described combined with cutter teeth of a particular form it is to be understood that said improvement can be used in connection with other types of felling saws.

What is claimed is:

A felling cross-cut saw including a blade provided with separate groups of teeth, each group including a set of cutter teeth sharpened on opposite sides alternately, rakers interposed between those groups of teeth adjacent the center of the saw blade each having diverging raker points, each of said rakers being separated from the two adjoining groups of cutter teeth by saw dust spaces extending into the blade beyond the inner ends of the cutter teeth, the remaining groups of cutter teeth each having a raker combined therewith at that end of the group remote from the center of the blade, each of the last named rakers being spaced from the next adjoining group of cutter teeth by a saw dust space and having a raker point and a rounded point, the rounded point being spaced inwardly from the line of cut of the raker point and being positioned at that side of the raker nearest the center of the blade.

In testimony that we claim the foregoing as our own, we have hereto affixed our signatures in the presence of two witnesses.

LENNART OSTERDAHL.
HARRY G. COWLING.

Witnesses:
RALPH HOOVER,
VIRGINIA B. HOOVER.